United States Patent [19]

Hudson

[11] 4,309,394

[45] Jan. 5, 1982

[54] METHOD OF PREPARING ULTRAPHOSPHORIC ACID

[75] Inventor: Robert B. Hudson, Kirkwood, Mo.

[73] Assignee: Monsanto Company, St. Louis, Mo.

[21] Appl. No.: 138,616

[22] Filed: Apr. 9, 1980

[51] Int. Cl.$^3$ ............................................. C01B 25/16
[52] U.S. Cl. ..................................... 423/317; 423/316
[58] Field of Search ............... 423/317, 318, 319, 320, 423/321 R, 321 S, 316

[56] References Cited

U.S. PATENT DOCUMENTS

| | | | |
|---|---|---|---|
| 1,823,923 | 9/1931 | Wild et al. | 423/317 |
| 2,247,373 | 7/1941 | Hartford et al. | 23/165 |
| 2,708,620 | 5/1955 | Winnicki | 423/317 |
| 3,526,482 | 9/1970 | Beltz et al. | 423/317 |

FOREIGN PATENT DOCUMENTS 54-84890 7/1979 Japan .

*Primary Examiner*—O. R. Vertiz
*Assistant Examiner*—Gregory A. Heller
*Attorney, Agent, or Firm*—S. M. Tarter; W. H. Duffey; R. C. Griesbauer

[57] ABSTRACT

Ultraphosphoric acid containing a phosphorus to hydrogen ratio of greater than 1 can be prepared by bringing together in a reaction zone elemental phosphorus and a sufficient amount of oxygen in a free-oxygen containing gas to form phosphorus pentoxide, and a sufficient amount of water to form ultraphosphoric acid. The mole ratio of water to phosphorus pentoxide is maintained less than 1:1. Heat is removed from the product stream of the reaction zone to condense at least some of the ultraphosphoric acid which is then collected. In the preferred embodiment, a heat exchange fluid such as pressurized water is circulated through a cooling coil positioned to remove heat from the product stream of the reaction zone. The ultraphosphoric acid can be combined with water to provide polyphosphoric acid.

14 Claims, 1 Drawing Figure

U.S. Patent   Jan. 5, 1982   4,309,394
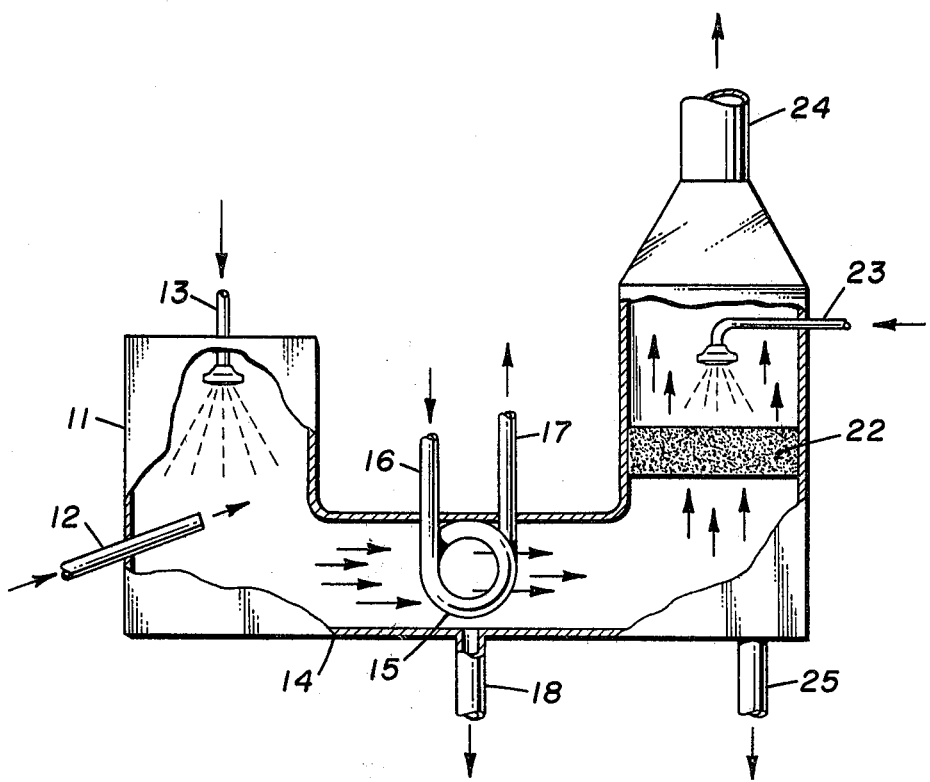

METHOD OF PREPARING ULTRAPHOSPHORIC ACID

BACKGROUND OF THE INVENTION

This invention relates to a process for preparing ultraphosphoric and polyphosphoric acid. This invention also relates to a process for preparing such phosphoric acids while simultaneously recovering valuable energy from burning of phosphorus.

Polyphosphoric acid, sometimes referred to as condensed phosphoric acid, is a mixture of polymerized acids having a general formula of $H_{n+2}(P_nO_{3n+1})$. It is used in the manufacture of polymerization catalysts, such as the production of propylene tetramer and for cyclizations, acylations and esterifications in organic syntheses. Polyurethane foams are also flame proofed with polyphosphoric acid. Polyphosphoric acid is produced in commercial quantities to satisfy these needs.

The prior art discloses several different ways of preparing polyphosphoric acid. One method involves mixing phosphorus pentoxide, with an appropriate amount of water in a stirred, cooled chamber. A second method involves heating mixtures of phosphorus pentoxide with orthophosphoric acid. A third method involves restricting the amount of water in certain types of phosphoric acid plants to obtain the desired polyphosphoric acid. Still another method involves boiling orthophosphoric acid to evaporate water until the desired concentration is reached. The maximum concentration that can be reached by the latter method is an azeotropic mixture which varies from 91.1 to 92.2 percent $P_2O_5$ depending upon the system pressure; however, the boiling point and corrosion increase rapidly as the acid becomes more concentrated and effectively limits the concentration to well below the azeotrope.

As is known to those skilled in the art, the phosphorus pentoxide useful to make polyphosphoric acid is prepared commercially by burning elemental phosphorus in a stream of dried air, allowing adequate time for completion of the reaction to prevent the formation of lower oxides of phosphorus. The resulting phosphorus pentoxide can be made so free of lower oxides that it will not decolorize dilute permanganate solutions. The usual plant for manufacturing phosphorus pentoxide consists of a phosphorus feed system, provisions for drying the air, a burning chamber, and a process step in which the phosphorus pentoxide gas is condensed and/or contacted with water to make phosphoric acid.

The prior art on the preparation of phosphorus pentoxide from elemental phosphorus abounds with references to the disastrous corrosive attack on metals of construction at elevated temperatures unless the system was kept very dry to avoid the formation of polymeric phosphoric acid. The condensation of polymeric acids on hot metal surfaces was thought to be particularly corrosive. The polymeric acids were commonly called "meta acid", a term used loosely to describe any polymeric acid composition that is not fluid at room temperature. Such compositions are those above about 85 percent $P_2O_5$. To avoid this corrosive attack, metal surfaces were either protected by a layer of refractory or maintained below 100° C. where the corrosion rate on Type 316 stainless steel is tolerable, and this method is used in most phosphoric acid plants capable of producing polyphosphoric acid from elemental phosphorus. Neither of these methods are attractive for recovery of heat at useful steam distribution pressures.

Although satisfactory results are achieved by using the prior art processes for preparing phosphorus pentoxide and thereafter converting the phosphorus pentoxide to polyphosphoric acid, there are certain disadvantageous aspects to the prior art processes. For one thing, no practical method has been developed for recovering the enormous amount of heat that is evolved from burning elemental phosphorus in air. Indeed, some prior art processes for preparing polyphosphoric acid are very energy intensive. All of the prior art processes require careful control of the conditions in order to obtain a satisfactory product and to avoid corrosion, and in all cases it is difficult to obtain a product with a high concentration of $P_2O_5$.

Now, according to the process of the present invention, ultraphosphoric acid can be prepared in the phosphorus burner while simultaneously recovering much of the heat that is generated by burning the elemental phosphorus, and such heat can be used for other processes rather than generate the heat by conventional means. The ultraphosphoric acid thus produced is a valuable intermediate in the preparation of polyphosphoric acid, and the concentration of the ultraphosphoric acid is limited only by its melting point.

SUMMARY OF THE INVENTION

These and other disadvantages in the prior art are overcome by a process which comprises (a) bringing together in a reaction zone elemental phosphorus, a sufficient amount of oxygen in a free-oxygen containing gas to form phosphorus pentoxide, and sufficient water to form ultraphosphoric acid, the mole ratio of water to phosphorus pentoxide being less than 1:1 to form a product stream; (b) removing heat from the product stream to cool the product stream below the dew point of ultraphosphoric acid; and (c) collecting the ultraphosphoric acid.

As used in the specification and claims, the term "orthophosphoric acid" shall refer to those acids containing a $H_2O$ to $P_2O_5$ mole ratio of 3:1 or greater. The term "polyphosphoric acid" shall refer to those acids containing a $H_2O$ to $P_2O_5$ mole ratio between about 3:1 and 1:1. The term "ultraphosphoric acid" shall refer to those acids containing a $H_2O$ to $P_2O_5$ mole ratio of less than 1:1.

BRIEF DESCRIPTION OF THE DRAWING

The sole FIGURE is a schematic representation of an elemental phosphorus burning apparatus containing a means for removing heat from the product stream to cool the product stream below the dew point of ultraphosphoric acid and to condense at least some of the ultraphosphoric acid and which illustrates the process of the present invention.

DETAILED DESCRIPTION OF THE INVENTION

Turning now to the drawing, a free-oxygen containing gas is introduced into chamber 11 through line 12. Liquid elemental phosphorus is introduced through line 13 as a spray to react with the free-oxygen containing gas in the reaction zone contained in chamber 11. The free-oxygen containing gas contains sufficient water to form ultraphosphoric acid, the mole ratio of water to phosphorus pentoxide being less than 1:1. The products of the reaction zone then pass through a crossunder conduit 14 which contains a cooling surface 15. A heat exchange fluid enters cooling surface 15 through pipe 16 and circulates through cooling surface 15 and exits through exit pipe 17, where the heat in the heat exchange fluid can be recovered. At least some of the ultraphosphoric acid condenses on cooling surface 15 and drains from cooling surface 15 and is removed from the system through product line 18.

The remainder of the products of the reaction zone then pass through crossunder conduit 14 and are contacted with weak phosphoric acid or water in absorber 22 which enters the absorber through scrub line 23. In absorber 22, the remainder of the ultraphosphoric acid and phosphorus pentoxide is converted to orthophosphoric acid. The remainder of the free-oxygen containing gas exits the system through exit conduit 24. Orthophosphoric acid is removed from the system through drain conduit 25 and can be used as a product or combined with the ultraphosphoric acid from product line 18 to form polyphosphoric acid.

The free-oxygen containing gas useful in the process of the present invention can be derived from any number of sources. For example, oxygen can be admixed with a noble gas such as neon, argon, krypton, xenon and the like. On the other hand, air or oxygen-enriched air can be used with satisfactory results, and air is preferred. Since the reaction with elemental phosphorus is so exothermic, the use of pure oxygen should be avoided as well as free-oxygen containing gases containing greater than about 50 volume percent oxygen.

The amount of oxygen should be at least enough to react with the elemental phosphorus to form phosphorus pentoxide and it is preferred to use an excess amount of oxygen to avoid the formation of the lower oxides of phosphorus. For example, if air is used about 30 percent excess air over the stoichiometric amount required to form phosphorus pentoxide should be introduced into the reaction chamber to avoid the formation of lower oxides of phosphorus. On the other hand, it is preferred to use less than about 200 mole percent excess air over the stoichiometric amount required to form phosphorus pentoxide to avoid handling excessive gas volumes and the reduction in the dew point of ultraphosphoric acid, but larger quantities of free-oxygen containing gas do not prevent operation of the present process.

The water required to form ultraphosphoric acid can be introduced into the reaction zone separately or it can be introduced with the air, and this is what I prefer to do. The appropriate amount of water in the air can be controlled by adding water vapor to the air or by drying the air as appropriate to provide sufficient water to form ultraphosphoric acid, while maintaining the mole ratio of water to phosphorus pentoxide at less than about 1:1.

The amount of water in the process can readily be controlled by controlling the dew point of the oxygen-containing gas entering the reaction zone. At high relative humidities, the amount of water can be controlled by drying the oxygen-containing gas using conventional techniques. On the other hand, at low relative humidities, water vapor (steam) can be added to the free-oxygen containing gas to provide the desired amount of water relative to the phosphorus pentoxide. Alternatively the ratio of water to phosphorus pentoxide can be controlled by varying the amount of excess oxygen-containing gas entering the reaction zone so that the moles of water entering the reaction zone relative to phosphorus pentoxide is maintained below 1:1. A combination of these techniques can also be used. As an example, the following tabulation shows mole percent phosphorus pentoxide in the mixture of phosphorus pentoxide and water as a function of the dew point of air entering the reaction zone at a flow rate of 200 percent excess combustion air over that required to form $P_2O_5$.

TABLE 1

| $H_2O/P_2O_5$ Mole Ratio As A Function Of Combustion Air Dew Point | | |
|---|---|---|
| $H_2O/P_2O_5$ Mole Ratio | Dew Point | |
| | °C. | °F. |
| 1.3 | 26.7 | 80 |
| 0.9 | 21.1 | 70 |
| 0.4 | 10 | 50 |
| 0.3 | 4.4 | 40 |
| 0.2 | −1.1 | 30 |

As noted above, the amount of water in the reaction zone to form the ultraphosphoric acid is critical in the process of the present invention. When the mole ratio of water to phosphorus pentoxide exceeds about 1:1, linear polyphosphoric acids are produced which are corrosive to the materials of construction at the temperatures normally used in the present process. On the other hand, when less than about 1 mole of water to 5 moles of phosphorus pentoxide is present, the ultraphosphoric acid that is produced contains crystalline phosphorus pentoxide and is so viscous that it is virtually a solid up to its sublimation temperature of about 580° C. Hence, it can be seen that the mole ratio of water to phosphorus pentoxide should be between about 1:5 and about 1:1, and it is preferred that the mole ratio of water to phosphorus pentoxide should be between about 1:2 and about 9:10.

In the process of the present disclosure, the viscosity of the ultraphosphoric acid is dependent upon the concentration and the temperature of the ultraphosphoric acid. This is exemplified by the data in Table 2 which were obtained using a Brookfield Rotoviscometer at temperatures between about 200° C. and 500° C. at different concentrations of $P_2O_5$ in the ultraphosphoric acid.

TABLE 2

| VISCOSITY OF $H_2O/P_2O_5$ MIXTURES | | |
|---|---|---|
| $H_2O/P_2O_5$ Mole Ratio | Temp., °C. | $\eta$, Centipoise |
| 1:1 | 418 | $1.36 \times 10^4$ |
| 1:1 | 357 | $3.66 \times 10^4$ |
| 1:1 | 272 | $1.86 \times 10^5$ |
| 1:1 | 198 | $1.27 \times 10^6$ |
| 0.9:1 | 487 | $1.23 \times 10^4$ |
| 0.9:1 | 390 | $5.29 \times 10^4$ |
| 0.9:1 | 262 | $5.40 \times 10^5$ |
| 0.8:1 | 447 | $3.43 \times 10^4$ |
| 0.8:1 | 345 | $1.67 \times 10^5$ |
| 0.8:1 | 236 | $1.70 \times 10^6$ |
| 0.7:1 | 452 | $9.56 \times 10^4$ |
| 0.7:1 | 345 | $6.27 \times 10^5$ |
| 0.7:1 | 252 | $6.31 \times 10^6$ |
| 0.6:1 | 505 | $6.75 \times 10^4$ |
| 0.6:1 | 430 | $1.96 \times 10^5$ |
| 0.6:1 | 382 | $4.74 \times 10^5$ |
| 0.6:1 | 265 | $7.20 \times 10^6$ |

From the data in Table 1 and in Table 2, it can be seen that the flow characteristics of the ultraphosphoric acid made according to the process of the present invention are dependent upon the water content as well as upon the temperature at which the ultraphosphoric acid is maintained in the system. Generally, the higher the temperature and the higher the water content of the ultraphosphoric acid, the more readily it flows. Optimum conditions for preparing the ultraphosphoric acid of predetermined composition and viscosity can readily be determined by those skilled in the art through routine experimentation.

Referring again to the drawing, cooling surface 15 can be any number of shapes, sizes and configurations in order to remove heat from the product stream from the reaction zone to condense at least some of the ultraphosphoric acid. In addition, the cooling surface can be constructed of rather ordinary materials of construction, such as stainless steel, and this is what I prefer to use. The optimum size and configuration can be determined by those skilled in the art for their particular system although I have found it convenient to use banks of stainless steel tubing placed perpendicular to the flow of the product stream from the reaction zone through crossunder conduit 14.

The temperature of the cooling surface 15 will depend upon a number of factors as will occur to those skilled in the art. For example, the particular cooling fluid employed, the configuration of the cooling surface, its relationship in the crossunder conduit 14 and other factors are all interrelated. It is preferred to maintain the temperature of the cooling surface between about 150° C. and about 800° C., preferably between about 200° C. and about 300° C.

Any number of fluids can be circulated through the cooling surface 15 by introduction into pipe 16 and discharged from the cooling surface through exit pipe 17. Suitable fluids include gases, such as air, nitrogen, helium, neon, argon, krypton and xenon and the like; water, such as pressurized water, steam, and the like; molten salt mixtures, such as a ternary mixture of approximately 16 percent by weight of lithium nitrate, 42 percent by weight of potassium nitrate and 42 percent by weight of sodium nitrate and the like; aromatic and aliphatic organic compounds such as aniline, pyridine, thiophene and substituted derivatives thereof and aliphatic nitro compounds such as nitromethane and aliphatic nitriles and the like. I prefer to use water at a temperature of about 200° C. and at a pressure of about 35 atmospheres.

When the product stream from the reaction zone contacts the cooling surface, the product stream is cooled to a temperature below the dew point of the ultraphosphoric acid in the product stream and much of the ultraphosphoric acid will condense on the cooling surface. This is no problem in the process of the present invention since the condensed ultraphosphoric acid will form a film on the cooling surface which tends to relieve heat stress in the metal created by the heat transfer fluid on one side and the hot product stream on the other. As long as the water to phosphorus pentoxide mole ratio is less than 1:1, the corrosion of the cooling surface is minimal. I prefer to cool the product stream to a temperature at least about 100° C. below the dew point of the ultraphosphoric acid in the product stream for efficient recovery of heat and ultraphosphoric acid. As will occur to those skilled in the art, the temperature of the cooled product stream will depend upon a number of factors, such as the temperature of the product stream leaving the reaction zone, the temperature of the cooling surface, the area of the cooling surface, and the like, and the temperature of the cooled product stream can readily be controlled through routine experimentation for any particular facility.

The ultraphosphoric acid made by the process of the present invention is a glass at room temperature, but flows at the temperatures used in the present process. Ultraphosphoric acid can be used as an intermediate in a number of chemical reactions, or it can be converted to polyphosphoric acid, an item of commerce, by the addition of water. Upon further addition of water, the polyphosphoric acid can be converted to orthophosphoric acid.

In order to convert ultraphosphoric acid to polyphosphoric acid, it is only necessary to combine the ultraphosphoric acid with the appropriate amount of water or orthophosphoric acid in an agitated container using conventional equipment and techniques. Since polyphosphoric acid is corrosive at elevated temperatures, the temperature is maintained below about 150° C. to prepare 115 percent phosphoric acid, and below about 120° C. to prepare 105 percent phosphoric acid. The appropriate temperatures to make other polyphosphoric acids can be determined by routine experimentation.

The invention is further illustrated by but not limited to the following Examples wherein all proportions are by weight unless otherwise indicated.

EXAMPLE I

An elemental phosphorus burner is modified by placing a U-tube in the crossunder conduit perpendicular to the flow of gases from the burning chamber. Pressurized water at a pressure of 35 atmospheres is circulated through the U-tube. Then, about 7,700 kilograms per hour of pressurized air is introduced into the burning chamber, and then about 454 kilograms per hour of molten elemental phosphorus is sprayed into the air from above. The dew point of the air is about 21° C. The temperature of the water circulating through the U-tube increases to about 200° C. and sufficient water flow is maintained in the U-tube to maintain this temperature. Ultraphosphoric acid condenses on the U-tube and drains to the bottom of the tube, and is withdrawn through a pipe attached to the crossunder conduit as illustrated in FIG. 1. About 13 kilograms of ultraphosphoric acid is recovered which contains a mole ratio of $H_2O$ to $P_2O_5$ of about 0.9:1. Calculations indicate that about 55,000 kilocalories per hour per square meter of cooling surface are recovered as steam for other uses.

EXAMPLE II

The general procedure of Example I is repeated except that a series of U-tubes is used to provide about 10 square meters of cooling surface, and 3,400 kilograms of air having a dew point of about 21° C. is used. About 540 kilograms of ultraphosphoric acid is recovered.

Although the invention has been described in specified embodiments which are set forth in considerable detail, it should be understood that this is by way of illustration only, and that the invention is not necessarily limited thereto, since alternative embodiments and operating techniques will become apparent to those skilled in the art in view of the disclosure. As an example, the invention has been illustrated with respect to one design of a facility to convert elemental phosphorus to phosphorus pentoxide wherein the product stream from the reactor chamber passes through a crossunder conduit. As is known to those skilled in the art, some facilities use crossover conduits rather than crossunder conduits, and some facilities have yet other configurations. In some facilities, the walls can be cooled with fluids, such as air or water, to recover additional usable heat. In addition, the cooling surface can be moved closer to the burning chamber or toward the absorber, or even placed in the burning tower. All such modifications are deemed to be equivalent for purposes of this invention. Accordingly, modifications are contemplated which can be made without departing from the spirit of the described invention.

What is claimed is:

1. A process for preparing ultraphosphoric acid which comprises:
    (a) bringing together in a reaction zone elemental phosphorus, a sufficient amount of oxygen in a free-oxygen containing gas to form phosphorus pentoxide, and sufficient water to form ultraphosphoric acid, the mole ratio of water to phosphorus pentoxide being less than 1:1, to form a product stream;
    (b) removing heat from the product stream to cool the product stream below the dew point of ultraphosphoric acid; and
    (c) collecting the ultraphosphoric acid.

2. A process of claim 1 wherein the mole ratio of water to phosphorus pentoxide is at least 1:5 but less than 1:1.

3. A process of claim 1 wherein the mole ratio of water to phosphorus pentoxide is at least about 0.6:1 but less than about 0.9:1.

4. A process of claim 3 wherein the free-oxygen containing gas is air and at least about 30 percent over the amount required to form phosphorus pentoxide is introduced into the reaction zone.

5. A process of claim 3 wherein the free-oxygen containing gas is air and less than about 200 percent over the stoichiometric amount required to form phosphorus pentoxide is introduced into the reaction zone.

6. A process of claim 1 wherein heat is removed by circulating a heat exchange fluid through a cooling surface placed in the product stream.

7. A process of claim 6 wherein the cooling surface is maintained between about 150° C. and about 800° C.

8. A process of claim 6 wherein the heat exchange fluid is selected from the group consisting of noble gases, free-nitrogen containing gases, eutectic salt mixtures, pressurized water and steam.

9. A process of claim 6 wherein the heat exchange fluid is pressurized water.

10. A process of claim 6, 7 or 9 wherein the cooling surface is a cooling coil positioned to remove heat from the product of the reaction zone.

11. A process of claim 1 wherein the collected ultraphosphoric acid is combined with sufficient water to provide polyphosphoric acid.

12. A process for preparing ultraphosphoric acid in a phosphorus burner which comprises:
    (a) bringing together in a reaction zone elemental phosphorus, a free-oxygen containing gas containing at least 30 percent in excess of stoichiometric amount of oxygen required to form phosphorus pentoxide, and sufficient water to form ultraphosphoric acid, the mole ratio of water to phosphorus pentoxide being at least about 1:5 but less than 1:1;
    (b) removing heat from the product stream by placing a cooling surface maintained between about 150° C. and about 300° C. to cool the product stream to below the dew point of ultraphosphoric acid;
    (c) condensing at least some of the ultraphosphoric acid on the cooling surface; and
    (d) recovering the ultraphosphoric acid.

13. A process of claim 12 wherein the mole ratio of water to phosphorus pentoxide is at least about 0.6:1 but less than about 0.9:1.

14. A process of claim 13 wherein heat is removed from the product stream by circulating pressurized water through the cooling surface.

* * * * *